June 11, 1963  W. R. KING  3,093,432

MOLDED ELECTRICAL CORD CONNECTOR

Filed Oct. 27, 1960

INVENTOR.
WILLIAM R. KING

BY
ATTORNEY

United States Patent Office 3,093,432
Patented June 11, 1963

3,093,432
MOLDED ELECTRICAL CORD CONNECTOR
William R. King, Denver, Colo., assignor to Minneapolis-Honeywell Regulator Company, Minneapolis, Minn., a corporation of Delaware
Filed Oct. 27, 1960, Ser. No. 65,485
2 Claims. (Cl. 339—59)

The present invention is concerned with an improved electrical connector and particularly with an improved photographic shutter cord connector in which the camera contact end of the shutter cord is provided with an improved construction utilizing a unique molded plug having a resilient tapered sleeve provided with a plurality of holes or openings extending completely through the sleeve, such a construction providing extremely effective bending or strain relief.

While the problem of bending or strain relief is of importance in most types of electrical connectors, the problem has been a particularly perplexing one in the art of the photographic shutter cords. These shutter cords of necessity must be small light-weight cords which must establish a reliable electrical circuit without unduly restricting the operation of a camera and the photographic flash unit to be used with the camera. As is well known, a camera which is synchronized to be used with a flash unit is provided with a normally open shutter switch controlled in synchronism with the shutter of the camera. The closing of this switch, while the shutter is open, completes an electrical circuit by means of a shutter cord to a flash unit which contains a source of illumination to be energized in synchronism with the opening of the camera shutter. The shutter cord is normally a separate piece of equipment which must be plugged into both the shutter switch outlet provided on the camera and the connector provided on the flash unit. Furthermore, when a flash unit is used, the photographer may manually hold the flash unit at a number of positions with respect to the camera to provide different lighting effects. Such an operation requires that the shutter cord be capable of flexing and bending to any position.

The present invention is directed to an arrangement for providing an improved bending and strain relief construction for accommodating such operation at various attitudes, without causing fatigue in the electrical wires within the shutter cord, to thereby provide a cord having a long and reliable life.

The present invention will be apparent to those skilled in the art upon reference to the following specification, claims, and drawing, of which:

Figure 2:
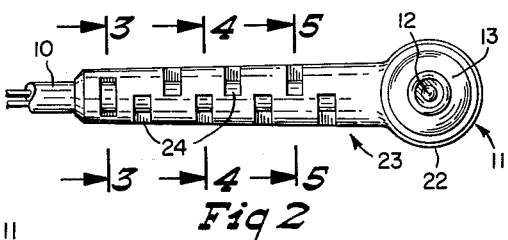
FIGURE 2 is a bottom view of the connector of FIGURE 1.
Figure 3:
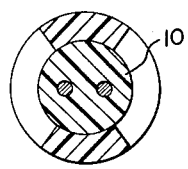
Figure 4:
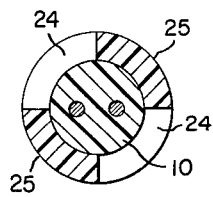
Figure 5:
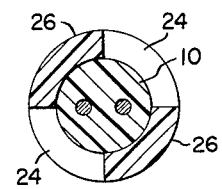
Figure 6:
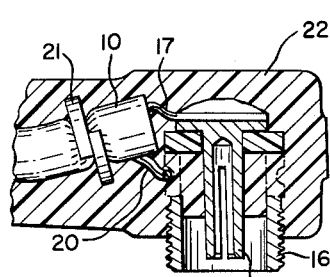
Figure 7:
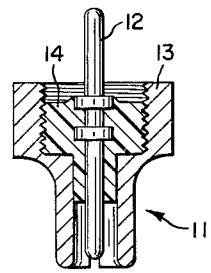
Figure 8:
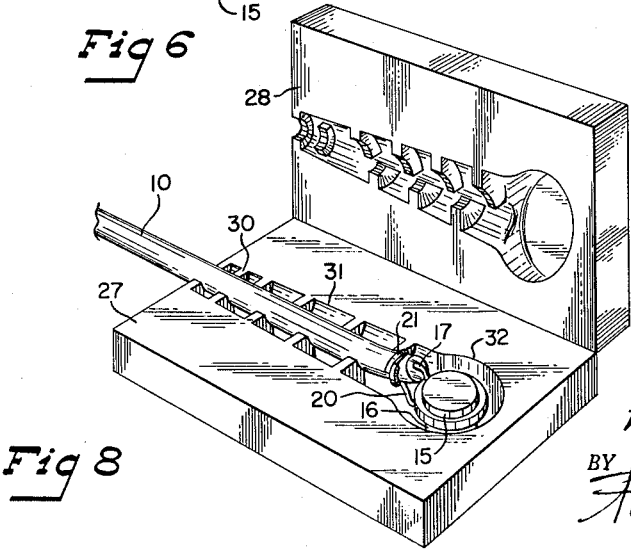

FIGURES 3, 4, and 5 are section views taken along the section lines 3, 4, and 5 of FIGURE 2, FIGURE 6 is a section view of the socket end of the electrical connector, showing the cord, a cord crimping strain relief means, and a first and second metallic contact, FIGURE 7 is a section view of one form of removable connector tip adapted to mate with the first and second metallic contacts of FIGURE 6, and FIGURE 8 is a view of the cord, the cord crimping strain relief means, and the first and second metallic contacts, placed in a mold prior to the molding of the connector plug.

Figure 1:
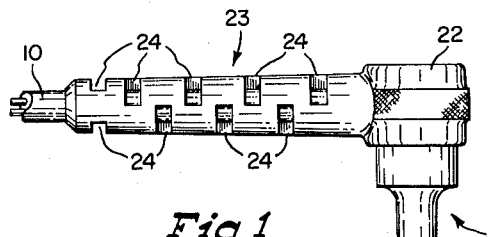
FIGURE 1 is a side view of the improved electrical connector.

Referring to FIGURE 1, this figure shows a side view of the improved electrical connector. Reference numeral 10 designates an insulated electrical cord having a pair of metallic conductors encased in an insulating jacket to form an electrical cord. One end of this electrical cord is connected to a connector, not shown, which is adapted to mate with the connector of a flash unit. The end terminal connector shown in FIGURE 1 is of a type adapted to mate with the shutter switch outlet of a camera. Specifically, the end terminal connector of FIGURE 1 is provided with the European or Din type terminal, as identified by reference numeral 11. This particular type terminal is seen more clearly in FIGURE 7 and from this figure it can be seen that the terminal is provided with a first centrally located metallic connector member 12 and a second annular metallic connector member 13, members 12 and 13 being separated by an insulating member 14. While the specific construction of FIGURE 7 does not form a part of the present invention, this construction provides a pin and socket type connection between connector member 12 and a socket 15 of FIGURE 6, while connector member 13 of FIGURE 7, and specifically the internal threads thereof, mate with the external threads on member 16 of FIGURE 6, to thus complete an electrical circuit. Also, as seen in FIGURE 6, socket 15 is connected to a first metallic cord conductor 17 while member 16 is connected to a second metallic cord conductor 20. The bottom view of the specific end terminal connector 11 is seen in FIGURE 2, showing the relative position of members 12 and 13.

Referring to FIGURES 1 and 6, the electrical cord 10, a cord crimping strain relief means 21 (see FIGURE 6) and members 15 and 16 are encased in a molded plug having a first terminal portion 22 and a second portion 23 formed as a flexible tapered sleeve. Strain relief means 21 may be a split metallic ring which, when compressed as shown, firmly grips the insulating jacket of the cord. The molded plug is formed of an insulating rubber-like material. The portion 22 of the plug is seen in section in FIGURE 6 and this portion is molded so as to form a solid plug of insulating material which firmly encases cord crimping strain relief means 21 and also members 15 and 16, to thus firmly position these members relative to each other. As a result, cord crimping strain relief means 21 provides a means whereby a pulling strain which is placed on cord 10 is transmitted through the cord to the strain relief means 21 and then to the plug portion 22 to thereby prevent an undue strain from being placed upon conductors 17 and 20 which connect to members 15 and 16.

The tapered sleeve portion 23 of the molded plug extends at right angles to the axis of end terminal connector 11, such that a direct pulling on cord 10 does not tend to separate connector 11 from a mating camera shutter switch outlet, unless such pulling force becomes excessively high. Furthermore, the sleeve portion 23 has its thickest dimension immediately adjacent plug 22 and the thickness of the sleeve is reduced, thus providing a tapered sleeve, as the sleeve progressively moves away from plug 22. In this manner, a construction is provided whereby the strain, due to bending of cord 10, is progressively relieved as the cord extends away from the plug 22. Furthermore, this tapered thin wall sleeve of insulating material, which is formed as an integral extension of plug 22, firmly surrounds and grips the jacket of cord 10, it being noted, however, that cord 10 may slide within sleeve 23 to some extent.

Within the teachings of the present invention, tapered sleeve 23 is provided with a plurality of spaced holes 24 which extend completely through the thin wall of the sleeve. These holes are radially disposed about the circumference of the sleeve and are axially staggered along the sleeve such that the sleeve may be characterized as a series of axially spaced thin walled rings which are joined by axially extending portions of the sleeve, to thereby provide the optimum in strain relief for all directions of bending of the cord.

As can be seen in FIGURES 3, 4, and 5 the holes 24 are grouped in pairs which are radially disposed opposite each other with a length which is equal to approximately 90° of the circumference of the sleeve. For example, FIGURE 4 shows a section of the sleeve and cord taken at the line 4—4, FIGURE 2. Thus, two holes 24 are seen to be oppositely disposed and the length of each hole is approximately equal to one-fourth, or 90° of the circumference of the sleeve, thus leaving portions 25 of sleeve 23 which are likewise oppositely disposed and whose inner surface engages the jacket of cord 10.

Furthermore, alternate pairs of these holes 24 are displaced approximately 90 degrees. Thus, in viewing FIGURE 5, it is seen that holes 24 of FIGURE 50 are rotated approximately 90 degrees from the position of holes 24 of FIGURE 4, and likewise the portions 26 of the sleeve 23 are rotated 90° from portions 25 of FIGURE 4. Thus, by alternating the pairs of slots as the slots are displaced along the sleeve, the portion of the flexible sleeve 23 which holds cord 10, holds the cord in different planes, thus providing improved flexibility.

As has been noted, holes 24 formed in insulating sleeve 23 extend completely through the sleeve to expose the jacket of cord 10. As a result, the bending of cord 10 causes very little if any tension or compression within the material making up the sleeve. Basically, the bending of the sleeve to accommodate bending of cord 10 is a flexing system which does not require the compression or stretching of any portion of sleeve 23, to thus give free operation of the bend relief with a minimum amount of strain being placed on cord 10. Specifically, the holes 24 are formed as thin rectangular slots. This form of hole not only provides a superior operation during bending of the cord 10, since the slots do not tend to buckle on the inward side of the bend, but also this type of slot facilitates a simpler molding operation.

A representative mold is shown in FIGURE 8 and this mold includes a first member 27 and a second member 28. The members 27 and 28 are provided with a plurality of inwardly extending fins, one of which has been identified by reference numeral 30. As can be seen, these fins are alternately spaced and are disposed along the length of the mold to form a sleeve chamber 31 communicating with a plug chamber 32. The view of FIGURE 8 shows a cord 10 placed in position with the cord crimping strain relief means 21 and conductors 17 and 20 connected to the members 15 and 16. With a mold of this type, cord 10 may be merely placed in position as shown in FIGURE 8 and this position is held during molding by means of fins 30 which function to form the slots 24 in the resulting sleeve. Fins 30 also function to mechanically hold cord 10 in a central position during molding. Furthermore, due to the fact that fins 30 have a thin rectangular shape, the opening of the mold can be accomplished by a simple straight pull to separate members 27 and 28, thus freeing a molded plug as shown in FIGURE 1. As a result, since conductor 10 is supported by means of fins 30 in the center of the sleeve chamber 31, to thus form slots 24 which extend completely through the sleeve 23 as seen in FIGURE 1, the cord is accurately aligned in the center of the sleeve, thereby keeping a constant wall thickness in the sleeve, as the wall thickness tapers, and thereby keeping the bend relief pressure constant in all directions during operation of the improved electrical connector.

From the above description it can be seen that I have provided an improved electrical connector for use in a photographic shutter cord wherein a unique tapered plug construction having radially and axially staggered holes provides the optimum in bending strain relief for all directions of bending of the photographic shutter cord. Other modifications of the present invention will be apparent to those skilled in the art and it is therefore intended that the scope of the present invention be limited solely to the scope of the appended claims.

I claim as my invention

1. In a molded photographic shutter cord,
a first metallic contact,
a second metallic contact which, when physically positioned in cooperative relation with said first contact, forms an electrical connector end terminal,
an electrical cord having a pair of flexible metallic conductors encased in a flexible insulating jacket and connected at one end to said first and second metallic contact members respectively,
cord crimping strain relief means directly mounted on said flexible jacket and encircling and firmly compressing said flexible jacket in the vicinity of said one end of said metallic conductors,
a solid plug of resilient insulating material molded around said one end of said cord, said strain relief means, and said first and second contacts, to firmly surround said strain relief means and to mount and hold said first and second contacts in said cooperative relation to form a mechanically stable connector end terminal having pulling strain relief for pulling forces extending along said electrical cord,
and a tapered flexible sleeve of insulating material molded as an integral extension of said solid plug, said sleeve having an interior dimension matching the exterior dimension of said insulating jacket to thus firmly surround and grip said insulating jacket to provide pulling strain relief for pulling forces extending along said electrical cord, said sleeve being provided with a plurality of rectangular shaped open holes which extend completely through said sleeve, said holes being grouped in pairs of holes which are circumferentially oppositely disposed and have a hole length equal to approximately 90° of the circumference of said sleeve, with alternate pairs of said holes being axially displaced and being circumferentially displaced approximately 90°.

2. In a molded photographic shutter cord,
a first metallic contact,
a second metallic contact which, when physically positioned in cooperative relation with said first contact, forms an electrical connector end terminal,
an electrical cord having a pair of flexible metallic conductors encased in a flexible insulating jacket and connected at one end to said first and second metallic contact members respectively,
cord crimping strain relief means directly mounted on said flexible jacket and encircling and firmly compressing said flexible jacket in the vicinity of said one end of said metallic conductors,
a solid plug of resilient insulating material molded around said one end of said cord, said strain relief means, and said first and second contacts, to firmly surround said strain relief means and to mount and hold said first and second contacts in said cooperative relation to form a mechanically stable connector end terminal having pulling strain relief for pulling forces extending along said electrical cord,
and a tapered relatively thin walled flexible sleeve of resilient insulating material molded as an integral extension of said solid plug, said sleeve being molded with an interior dimension matching the exterior dimension of said insulating jacket, to thus firmly surround and to grip said insulating jacket to provide pulling strain relief for pulling forces extending along said electrical cord, said sleeve being provided with a plurality of spaced open holes which extend completely through the thin wall of said sleeve, said holes being disposed about the circumference of said sleeve and being spaced along the length of said sleeve to thereby provide bending strain relief for all directions of bending of said electrical cord.

References Cited in the file of this patent

UNITED STATES PATENTS

| | | |
|---|---|---|
| 1,871,397 | Watts | Aug. 9, 1932 |
| 2,322,491 | Williams | June 22, 1943 |
| 2,604,660 | Karns | July 29, 1952 |
| 2,727,088 | La Wall | Dec. 13, 1955 |

FOREIGN PATENTS

| | | |
|---|---|---|
| 1,232,887 | France | Apr. 27, 1960 |